United States Patent [19]

Hawkins

[11] Patent Number: 4,957,610

[45] Date of Patent: Sep. 18, 1990

[54] GENERATION OF HYDROGEN AND OXYGEN

[76] Inventor: James T. Hawkins, 2620 Downing Ave., Cincinnati, Ohio 45208

[21] Appl. No.: 303,115

[22] Filed: Jan. 30, 1989

[51] Int. Cl.$^5$ .................................................. C25C 1/02
[52] U.S. Cl. ............................... 204/129; 204/157.41; 204/157.50; 204/157.52; 204/252; 204/263; 204/275
[58] Field of Search ....................... 204/157.41, 157.50, 204/157.52, 157.40, 129, 263, 266, 275, 278, 252

[56] References Cited

U.S. PATENT DOCUMENTS

| | | | |
|---|---|---|---|
| 3,925,212 | 12/1975 | Tchernev | 204/129 |
| 4,011,149 | 3/1977 | Nozik | 204/129 |
| 4,090,933 | 5/1978 | Nozik | 204/129 |
| 4,147,602 | 4/1979 | Garbuny et al. | 204/157.1 R |
| 4,211,620 | 7/1980 | Fowler | 204/157.5 |
| 4,342,738 | 8/1982 | Burgund | 423/579 |
| 4,424,592 | 1/1984 | Lee et al. | 372/79 |
| 4,437,954 | 3/1984 | Sammells et al. | 204/129 |
| 4,501,804 | 2/1985 | Bockris et al. | 429/111 |
| 4,511,450 | 4/1985 | Neefe | 204/278 |
| 4,521,499 | 6/1985 | Switzer | 204/59 R |
| 4,563,286 | 1/1986 | Johnson et al. | 210/721 |

*Primary Examiner*—John F. Niebling
*Assistant Examiner*—Kathryn Gorgos
*Attorney, Agent, or Firm*—Weston Hurd Fallon Paisley & Howley

[57] ABSTRACT

Hydrogen and oxygen are generated by directing the output of a solar-pumped laser through a beam expander and a frequency multiplier to increase the frequency of the laser beam to the ultraviolet level. The frequency-multiplied laser beam is directed onto an anode and a cathode disposed in a reactor vessel. The anode is electrically connected to the cathode. An electrolytic solution surrounds the anode and the cathode. Hydrogen is evolved at the cathode, and oxygen is evolved at the anode.

13 Claims, 2 Drawing Sheets

GENERATION OF HYDROGEN AND OXYGEN

BACKGROUND OF THE INVENTION

1. Field of the Invention

The invention relates to the generation of hydrogen and oxygen and, more particularly, to a technique for using solar energy to produce hydrogen and oxygen by the photo-electrolysis of water.

2. Description of the Prior Art

Considerable effort has been expended in recent years in attempting to develop non-petroleum sources of fuel. One area of particular interest has been the generation of hydrogen through the photo-electrolysis of water using solar energy. U.S. Pat. Nos. 3,925,212; 4,011,149; 4,090,933; 4,342,738; 4,147,602; 4,437,954; 4,501,804; 4,511,450; and 4,563,286 are examples of developments related to generating hydrogen through the use of solar energy. Generally speaking, the referenced devices employ a cell within which water and a pair of spaced electrodes are disposed. The electrodes usually are made of an n-type or p-type semiconductor material. Sunlight is directed onto the cell causing photo-electrolysis to occur. Hydrogen is liberated at the cathode, and oxygen is liberated at the anode. The gases thus evolved can be collected for use as fuels or for photo-electrolysis of water. The invention converts a greater majority of the sun's terrestrial energy (sunlight) to the near-ultraviolet wave length, thereby enabling this photon energy to be "tuned" and used more effectively in the photochemical conversion process. "Tuning" the photon energy is accomplished by changing the mechanical dimensions, or composition, of a solid-type laser rod or, in the case of a liquid laser, formulating the liquid so that the output frequency of the liquid laser is appropriately tuned to the frequency of light that is the most suitable for the type of electrode utilized.

The invention employs a reactor vessel having first and second chambers separated by an ion-permeable membrane. The reactor vessel can be provided in various cell configurations, such as a cubic chamber or in the honey comb arrangement. An electrolytic solution is placed in the first chamber and a cathode in the second chamber. The anode and the cathode are connected electrically.

Solar energy is converted to a more efficient form as described previously and is directed into the reactor vessel where electrolysis occurs. The conversion is accomplished as follows. Sunlight is directed by means of a parabolic reflector onto a concentrator or other light bending device included as part of a solar-pumped laser. A laser beam is produced which then is directed through an expanding lens and thence through a frequency multiplier where frequency is raised and tuned into the near-ultraviolet or ultraviolet range. The light from the frequency multiplier is directed onto the anode and the cathode in a reactor vessel.

By use of the present invention, solar energy available for photo-electrolysis can be significantly increased. It is believed that through use of the present invention, the hydrogen thus produced will represent an economically viable alternative to the use of petroleum fuels.

The foregoing and other features and advantages of the invention are described in more detail in the specification and claims that follow.

DESCRIPTION OF THE PREFERRED EMBODIMENT

Figure 1:
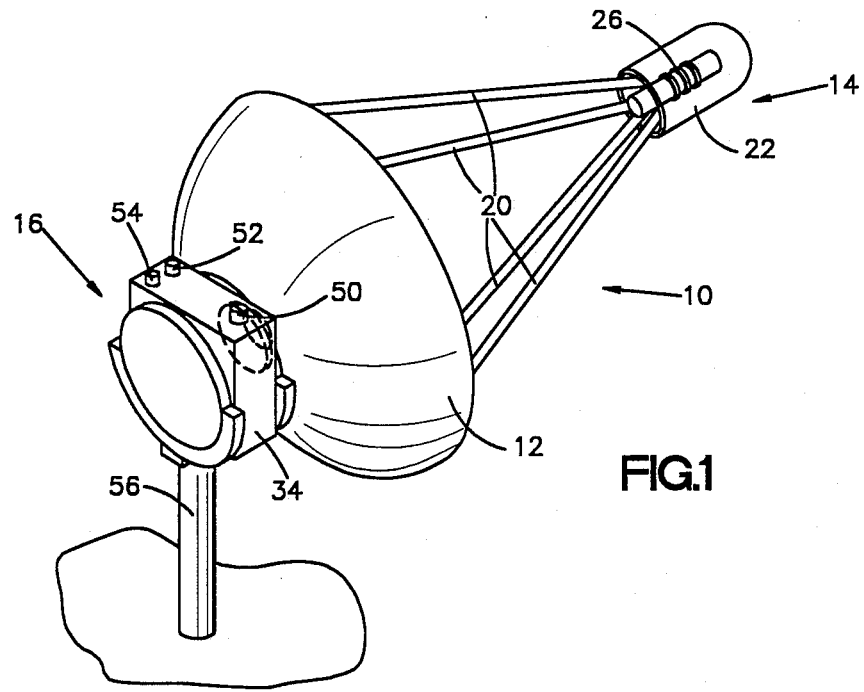
FIG. 1 is a flow chart showing how the present invention produces hydrogen and oxygen.

Referring to FIG. 1, apparatus for producing hydrogen and oxygen through the photo-electrolysis of water is indicated schematically by the reference numeral 10. The apparatus 10 includes a solar collector 12, frequency matching equipment 13, a beam expander 14, and a reactor vessel 16.

Figure 2:
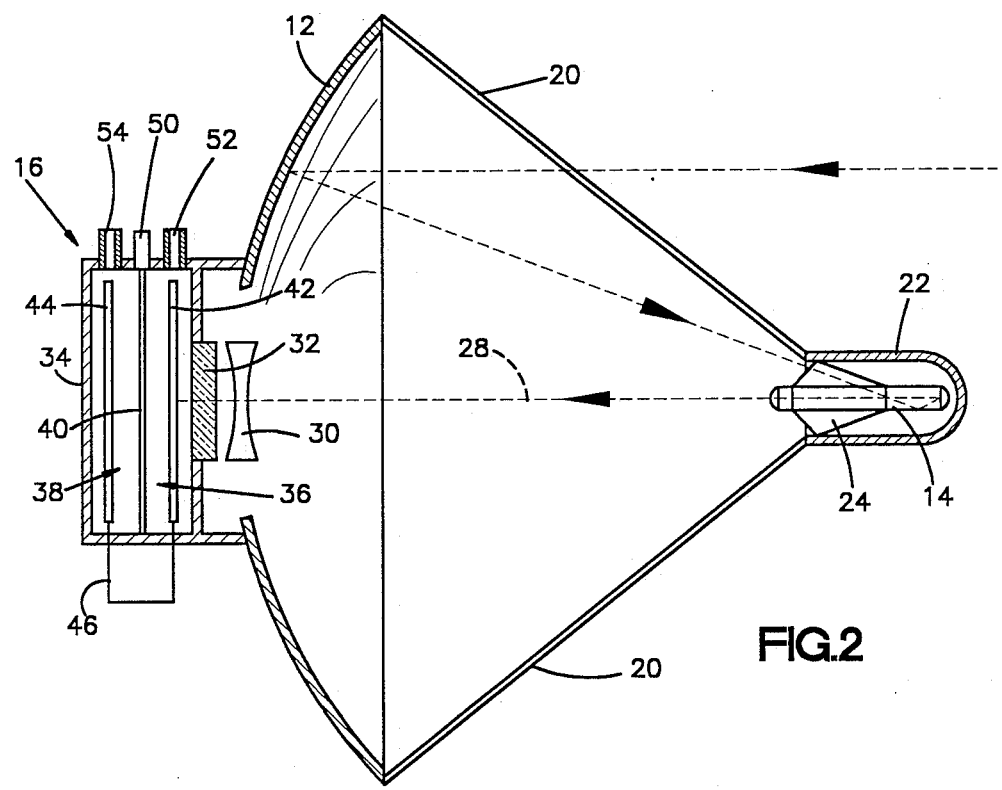
FIG. 2 is a schematic, perspective view of hydrogen and oxygen producing apparatus according to the invention.
Figure 3:
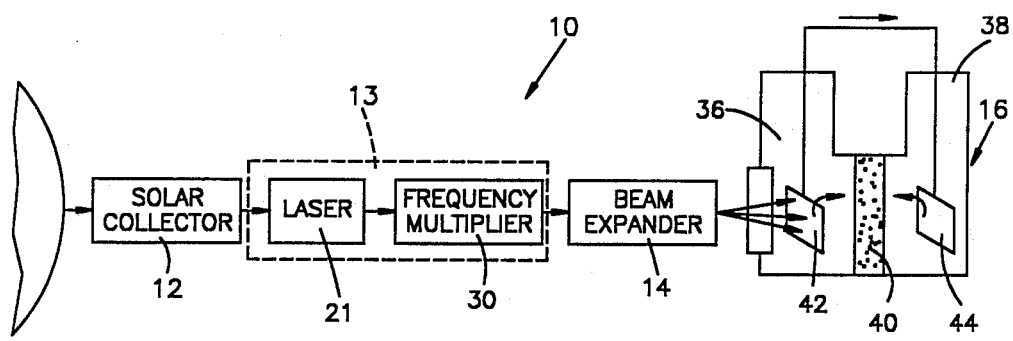
FIG. 3 is a cross-sectional view of the apparatus shown in FIG. 2.

Referring also to FIGS. 2 and 3 where the various components of the apparatus 10 are shown in more detail, the solar collector 12 is a parabolic reflector having an opening 18 at its center. The reactor vessel 16 is securely connected to the convex side of the reflector 12, surrounding the opening 18. A plurality of rods, or structs 20 are secured to the reflector 12 at its periphery and extend toward each other on the concave side of the reflector 12.

The frequency matching equipment includes a laser 21 disposed within a cuplike housing 22, the open end of which is aligned with the opening 18. The struts 20 are connected to the open end of the housing 22. A light concentrator 24 is disposed about the laser 21. The concentrator 24 can be any well known type of concentrator such as a parabolic concentrator, a magnifying glass concentrator, or a Fresnel mirror concentrator. The shape of the reflector 12 is such that incident sunlight is reflected from the convex surface of the reflector 12 onto the concentrator 24. The laser 21 is a so-called solar-pumped laser of the type described in U.S. Pat. No. 4,424,592, the disclosure of which is incorporated herein by reference. A plurality of coils 26 surround the laser 21 in order to circulate a coolant to prevent overheating of the solid laser 21. By virtue of the concentrated incident sunlight striking the laser 21, a laser beam is produced. The laser beam is indicated by the dotted line 28 in FIG. 3.

The frequency matching equipment 13 includes a frequency multiplier 30 disposed in the path of the laser beam 28. The frequency multiplier 30 increases the frequency of the expended laser beam 28 to within the ultraviolet or near-ultraviolet range, approximately 320 nm.

The beam expander 14 is disposed within the opening 18, intermediate the laser 21 and the reactor vessel 16. The beam expander 14 can be any high quality optical lens that expands the highly collimated laser beam 28.

The reactor vessel 16 includes a housing 34 having a window 35 that is transparent to the light received from the frequency multiplier 30. The window 35 preferably is made of quartz because quartz transmits ultraviolet or near-ultraviolet light better than plain glass. The housing 34 is connected to the reflector 12 as indicated previously. The housing 34 includes a first chamber 36 and a second chamber 38 divided by an ion-permeable membrane 40. The membrane 40 could be an agar salt bridge saturated with potassium chloride. A photo-anode in the form of an n-type semiconductor electrode 42 is disposed in the first chamber 36, while a photo-cathode in the form of a p-type semiconductor electrode 44 is disposed within the second chamber 38. The electrodes 42, 44 are connected by means of an electrical circuit 46. Light from the frequency matching equipment 13 is directed onto the electrode 42 the counter electrode 44 is an inert conductor. A low voltage direct current source (not shown) can be connected in the lead 46 to impress a voltage of about 1.5-2.0 volts across the electrodes 42, 44, if necessary.

An inlet 50 permits water or an aqueous electrolytic solution to be directed into the first and second chambers 36, 38. An outlet 52 is connected to the first chamber 36 and permits oxygen that is liberated at the photo-anode 42 to be discharged from the first chamber 36. Similarly, a hydrogen outlet 54 is connected to the second chamber 38 to permit hydrogen liberated at the photo-cathode 44 to be discharged from the second chamber 38. The housing 34 is mounted atop a mounting mast 56. The mast 56 is part of an equitorial sun-guided system (not shown) that enables the reflector 12 to follow the sun to receive the optimum amount of solar energy.

As has been indicated already, various types of electrodes 42, 44 can be used in the reactor vessel 16. Suitable examples are shown in U.S. Pat. Nos. 3,925,212; 4,011,149; 4,090,933; and 4,501,804, the disclosures of which are incorporated herein by reference. The type of solution used in the reactor vessel 16 must be matched to the type of materials used for the electrodes 42, 44. As those skilled in the art will be aware, the solution could be $H_2SO_4$, HCl, or $H_2SO_4$ in one chamber and HCl in the other chamber. The electrolytic solution also could be an aqueous solution which is acidic, neutral, or basic. As noted in the '933 patent, suitable examples includes 0.1N KOH and 0.2N $H_2SO_4$. Also, as noted in U.S. Pat. No. 4,437,954, the disclosure of which is incorporated herein by reference, the electrolytic solution can be an aqueous solution including so-called biomass materials such as monosaccharides, polysaccharides, and lignins. The aqueous electrolyte also can include various enzymes.

An Alternative Embodiment

Figure 4:
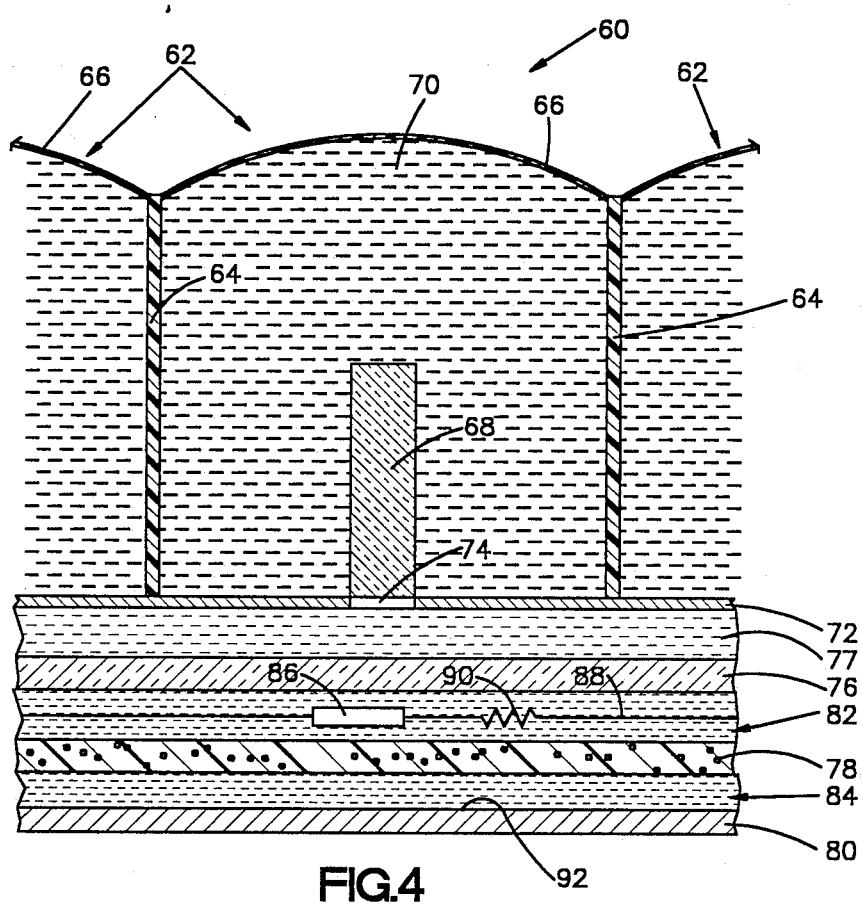
FIG. 4 is a cross-sectional view of an alternative embodiment of hydrogen and oxygen producing apparatus according to the invention.

Referring now to FIG. 4, an alternative apparatus for producing hydrogen and oxygen through the photo-electrolysis of water is indicated generally by the reference numeral 60. The apparatus 60 is similar in operation to the apparatus 10, although there are significant differences as will be apparent from the following description.

The apparatus 60 includes a number of honeycomb cells 62 formed by walls 64. The walls 64 are arranged in a hexagonal pattern when viewed from above in order to create a honeycomb arrangement. It is expected that the apparatus 60 can occupy a substantial area such as the roof of a house.

Each of the cells 62 is enclosed by a transparent cover 66. A micro laser rod 68 is disposed at the center of each of the cells 62. The cover 66 and the liquid 70 serve as optical concentrators to direct sunlight onto the rear face of the laser 68. The cells 62 and the laser 68 rest atop a barrier plate 72. The plate 72 is impermeable to sunlight except for small windows 74 disposed at the end of the laser 68. The windows 74 are made of quartz in order to transmit light without resistance to ultraviolet radiation.

A clear, plate-like barrier 76 made of plastics material is spaced from the plate 72. A liquid lasant 77 is disposed within the intervening cavity. Similarly, an ion-permeable membrane 78 is spaced from the barrier 76, and a planar, metal or ceramic substrate 80 is disposed parallel to, and spaced from, the membrane 78. The space between the barrier 76 and the membrane 78 defines a chamber 82, while the space between the membrane 78 and the substrate 80 defines another chamber 84. The chamber 82 has a photo-anode in the form of an n-type semiconductor electrode 86 from which a lead line 88 having a resistance such as by means of a resistor 90, extends. A cathode layer 92 forms the inner surface of the substrate 80. The cathode layer 92 can be a metal such as platinum or copper applied to the substrate 80 by techniques such as plasma spraying. The electrode 86 is connected to the cathode layer 92 by means of the lead line 88.

The ion-permeable membrane 78 is substantially similar to the membrane 40, which the chambers 82, 84 are filled with an electrolytic solution selected from one of those disclosed for use with the reactor vessel 16. Suitable outlets (not shown) are connected to the chambers 82, 84.

As with the apparatus 10, all of the components of the apparatus 60 are commercially available. For example, a laser rod 68 is available from the Southampton University Optical Fiber Group in Southampton, England. Liquid lasant material is available from companies such as Kodak of Rochester, NY. Photo-catalytic electrodes are available from a variety of commercial sources.

As has been indicated already, the operation of the apparatus 60 is similar to that of the apparatus 10. That is, sunlight is concentrated onto the end of each of the lasers 68. Due to the characteristics of the laser 68 and the lasant 77, a laser beam is generated that is in the ultraviolet or near-ultraviolet range without the use of a frequency multiplier or beam expander. The laser beam is directed onto the electrodes 86, 92 where oxygen and hydrogen are liberated, respectively.

The present invention greatly increases the efficiency of the photo-electrolysis process, thereby making the production of hydrogen and oxygen a much more economically feasible process than has been possible previously. The hydrogen and oxygen produced by the invention are quite pure, and their production is accomplished without generation of heat in measurable quantities and without harmful by-products.

Although the invention has been described in its preferred form with a certain degree of particularity, it will be understood that the present disclosure of the preferred embodiment has been made only by way of example and that various changes may be resorted to without departing from the true spirit and scope of the invention as hereinafter claimed. It is intended that the patent shall cover, by suitable expression in the appended claims, whatever features of patentable novelty exist in the invention disclosed.

What is claimed is:

1. A method of generating hydrogen and oxygen, comprising the steps of:
   providing a reactor vessel having first and second chambers;
   placing an electrolytic solution in the first and second chambers;

placing an anode in the first chamber and a cathode in the second chamber;

connecting the anode and the cathode electrically;

producing a solar-induced laser beam by directing sunlight onto a solar-pumped laser;

multiplying the frequency of the laser beam to the ultraviolet frequency; and directing the frequency-multiplied ultraviolet light onto the anode and the cathode where oxygen is produced at the anode and hydrogen is produced at the cathode.

2. The method of claim 1, wherein the laser beam is produced by concentrating solar energy onto a solar-pumped laser.

3. The method of claim 2, wherein solar energy is concentrated by reflecting the solar energy from a parabolic mirror.

4. The method of claim 1, further comprising the step of expanding the laser beam prior to multiplying the frequency of the laser beam.

5. The method of claim 4, wherein the laser beam is expanded by being passed through a lens.

6. The method of claim 1, further comprising the step of separating the first and second chambers by an ion-permeable membrane.

7. Apparatus for generating hydrogen and oxygen, comprising:

a reactor vessel having first and second chambers, the first and second chambers adapted to contain an electrolytic solution;

an anode disposed in the first chamber and a cathode disposed in the second chamber, the anode and the cathode being connected electrically;

a solar-pumped laser having an output beam; and means for multiplying the frequency of the laser beam to the ultraviolet level and directing the frequency-multiplied laser beam onto the anode and the cathode where oxygen is produced at the anode and hydrogen is produced at the cathode.

8. The apparatus of claim 7, wherein the means for multiplying the frequency of the laser beam is in the form of a crystal.

9. The apparatus of claim 7, further comprising a beam expander disposed intermediate the laser and the means for multiplying the frequency of the laser beam.

10. The apparatus of claim 7, further comprising an oxygen outlet connected to the first chamber, a hydrogen outlet connected to the second chamber, and an electrolytic solution inlet connected to both the first and second chambers.

11. The apparatus of claim 7, further comprising an ion-permeable membrane separating the first and second chambers.

12. The apparatus of claim 7, further comprising a plurality of reactor vessels having a hexagonal outer configuration, the vessels being connected together to form a honeycomb cell array.

13. Apparatus for generating hydrogen and oxygen, comprising:

a honeycomb cell comprising a cover and containing a laser rod capable of generating an output beam;

a plate-like barrier to which the cell is secured, said barrier comprising a light-transmissive window, the laser rod being secured to the barrier adjacent the window such that the output beam is directed through the window;

a chamber on the opposite side of the barrier from the cell having a light-transmissive barrier, said chamber containing a liquid lasant into which the output beam is directed;

an ion-permeable membrane spaced from the light-transmissive barrier to define an anode chamber;

a plate-like substrate spaced from the ion-permeable membrane to define a cathode chamber;

a photo-anode disposed within the anode chamber, and a photo-cathode disposed within the cathode chamber, the anode and the cathode being connected electrically; and an electrolytic solution disposed within the anode and the cathode chambers where oxygen is produced at the anode and hydrogen is produced at the cathode.

* * * * *